(12) United States Patent
Perez

(10) Patent No.: US 10,581,231 B1
(45) Date of Patent: Mar. 3, 2020

(54) ELECTRICAL PANEL ASSEMBLY

(71) Applicant: Sergio Perez, Naples, FL (US)

(72) Inventor: Sergio Perez, Naples, FL (US)

( * ) Notice: Subject to any disclaimer, the term of this patent is extended or adjusted under 35 U.S.C. 154(b) by 0 days.

(21) Appl. No.: 16/134,551

(22) Filed: Sep. 18, 2018

(51) Int. Cl.
*H02G 3/08* (2006.01)
*H02B 1/40* (2006.01)
*H02G 1/00* (2006.01)
*H02G 3/14* (2006.01)

(52) U.S. Cl.
CPC .............. *H02G 3/083* (2013.01); *H02B 1/40* (2013.01); *H02G 1/00* (2013.01); *H02G 3/14* (2013.01)

(58) Field of Classification Search
CPC .......... H02G 3/08; H02G 3/081; H02G 3/083; H02G 3/14; H02G 1/00; H02G 3/22; H02G 3/24; H02G 3/26; H02B 1/40; H05K 5/00; H05K 5/02; H05K 5/0217; H05K 5/0247
USPC .. 174/480, 481, 50, 53, 57, 58, 559, 60, 59, 174/64, 68.1, 68.3, 72 A; 220/3.2–3.9, 220/4.02; 361/600, 601
See application file for complete search history.

(56) References Cited

U.S. PATENT DOCUMENTS

| | | | | |
|---|---|---|---|---|
| 3,584,136 A | * | 6/1971 | Robert | H02G 3/121 174/53 |
| 4,998,343 A | * | 3/1991 | Costello | H02G 3/16 174/72 A |
| 5,638,256 A | * | 6/1997 | Leach | H02B 1/50 174/58 |
| 5,663,525 A | * | 9/1997 | Newman | H02G 3/10 174/50 |
| 6,229,692 B1 | | 5/2001 | Stendardo | |
| 6,677,519 B2 | * | 1/2004 | Rumsey | H02G 3/088 174/50 |
| 6,791,213 B2 | | 9/2004 | Miller | |
| 6,999,305 B1 | | 2/2006 | Calcote | |
| 7,381,907 B1 | * | 6/2008 | Frusco | H02G 3/10 174/481 |
| 7,423,215 B2 | * | 9/2008 | Cardenas | H02G 3/121 174/480 |
| 7,706,135 B2 | * | 4/2010 | Sharp | H02G 3/185 174/50 |
| 7,737,360 B2 | * | 6/2010 | Wiemeyer | H04Q 1/13 174/481 |
| 8,500,480 B2 | | 8/2013 | van Beveren | |
| 8,547,684 B2 | | 10/2013 | Diaz | |
| 8,642,885 B2 | * | 2/2014 | Davila | H02G 3/086 174/50 |
| 8,901,417 B2 | * | 12/2014 | Herring | H05K 5/0217 174/50 |

(Continued)

*Primary Examiner* — Angel R Estrada

(57) ABSTRACT

An electrical panel assembly for easing installing conductors in a replacement electrical panel in a wall includes an electrical panel that is mountable in a wall. The electrical panel has a front side and an outer wall, and the outer wall has a top side and a bottom side. Each of the top, bottom and front sides is open to access an interior of the electrical panel. A top panel is removably coupled to the top side of the electrical panel. The top panel has a plurality of apertures extending therethrough and each of the apertures has a conductor extended therethrough. A bottom panel is removably coupled to the bottom side of the outer wall of the electrical panel. The bottom panel has a plurality of apertures extending therethrough and each of the apertures in the bottom panel has a conductor extended therethrough.

8 Claims, 4 Drawing Sheets

(56) References Cited

U.S. PATENT DOCUMENTS 9,490,611 B2 11/2016 Westrick, Jr.
9,692,213 B2 6/2017 Mittelstadt

* cited by examiner

ELECTRICAL PANEL ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to electrical panel devices and more particularly pertains to a new electrical panel device for easing installing conductors in a replacement electrical panel in a wall.

BRIEF SUMMARY OF THE INVENTION

An embodiment of the disclosure meets the needs presented above by generally comprising an electrical panel that is mountable in a wall. The electrical panel has a front side and an outer wall, and the outer wall has a top side and a bottom side. Each of the top, bottom and front sides is open to access an interior of the electrical panel. A top panel is removably coupled to the top side of the electrical panel. The top panel has a plurality of apertures extending therethrough and each of the apertures has a conductor extended therethrough. A bottom panel is removably coupled to the bottom side of the outer wall of the electrical panel. The bottom panel has a plurality of apertures extending therethrough and each of the apertures in the bottom panel has a conductor extended therethrough.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
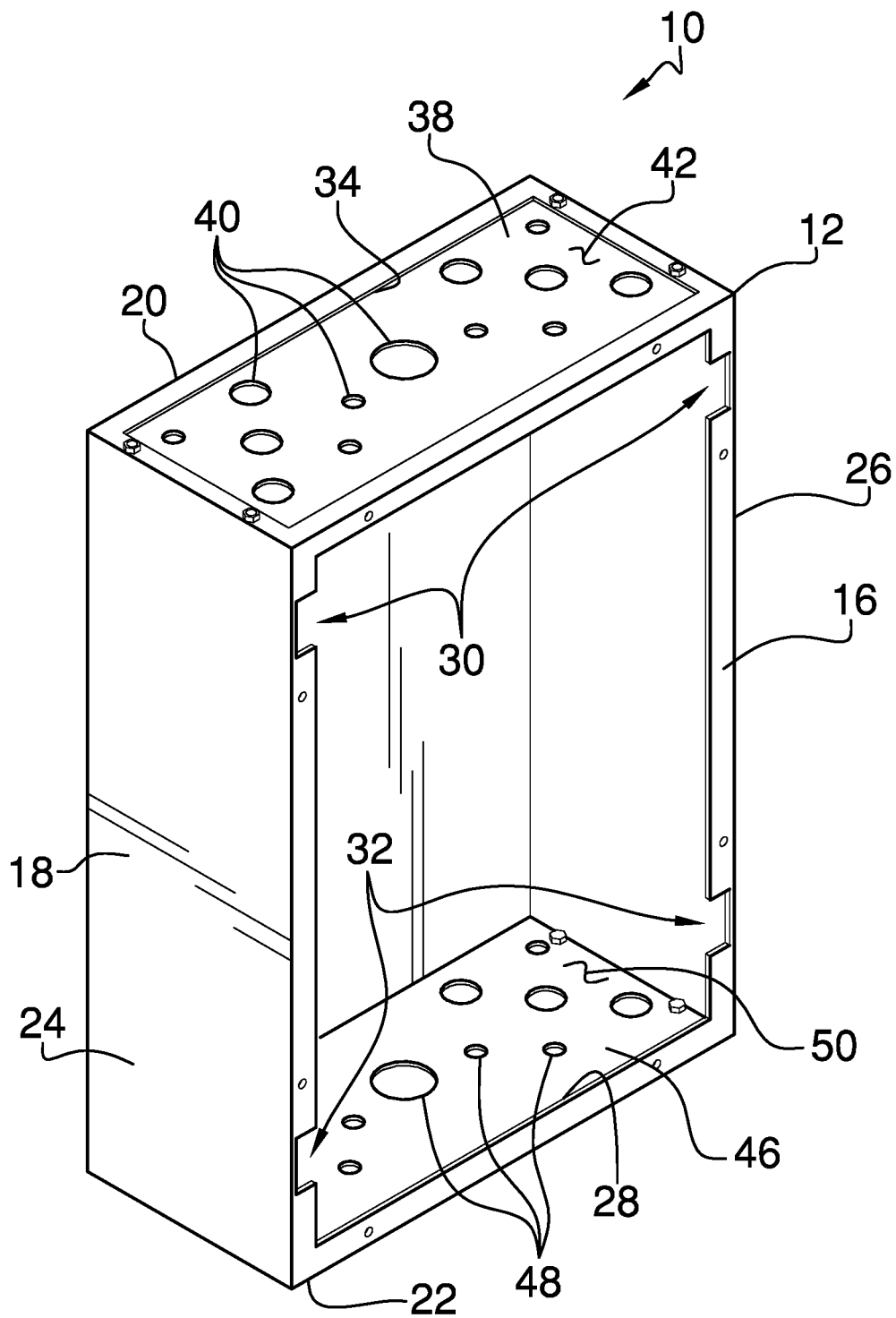
FIG. 1 is a front perspective view of an electrical panel assembly according to an embodiment of the disclosure.
Figure 2:
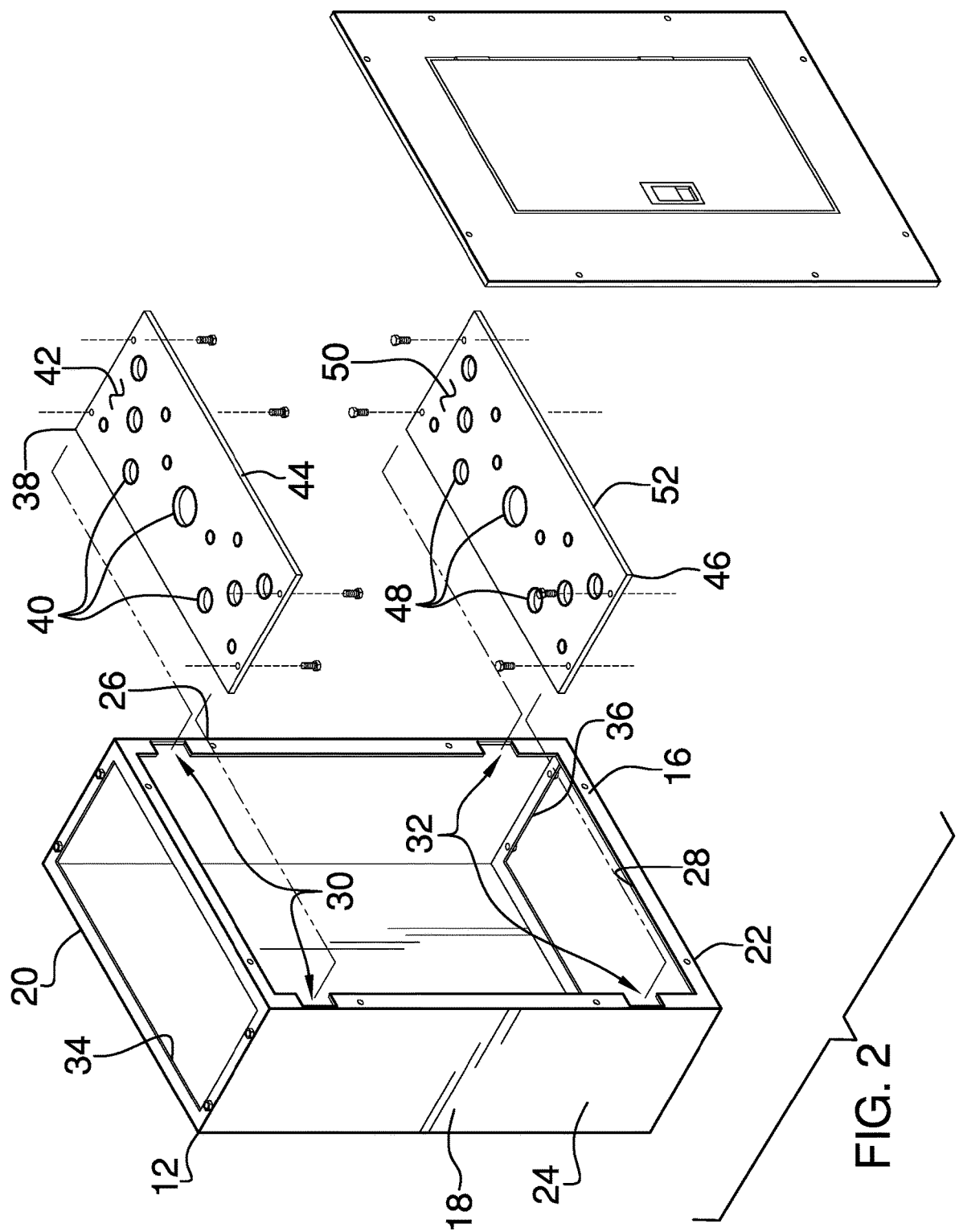
FIG. 2 is an exploded perspective view of an embodiment of the disclosure.
Figure 3:
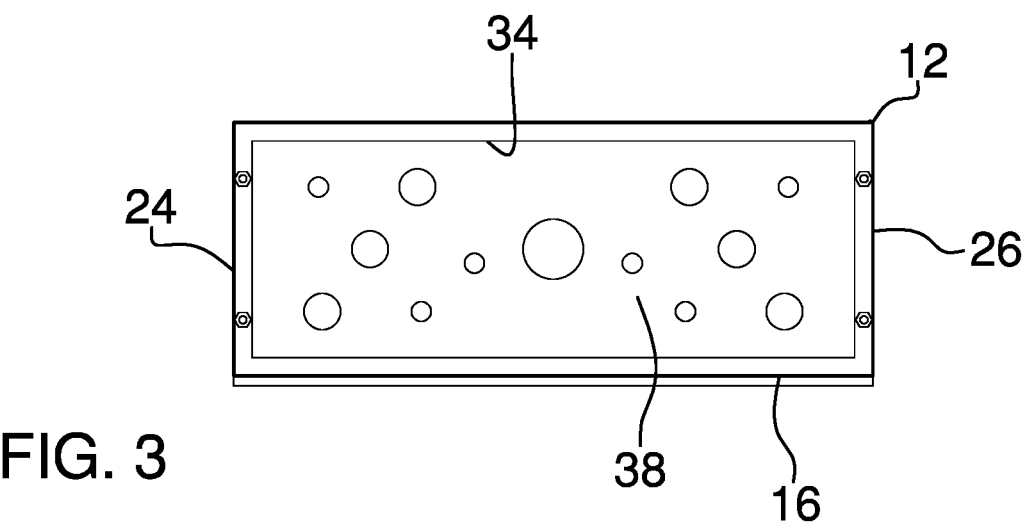
FIG. 3 is a bottom view of an embodiment of the disclosure.
Figure 4:
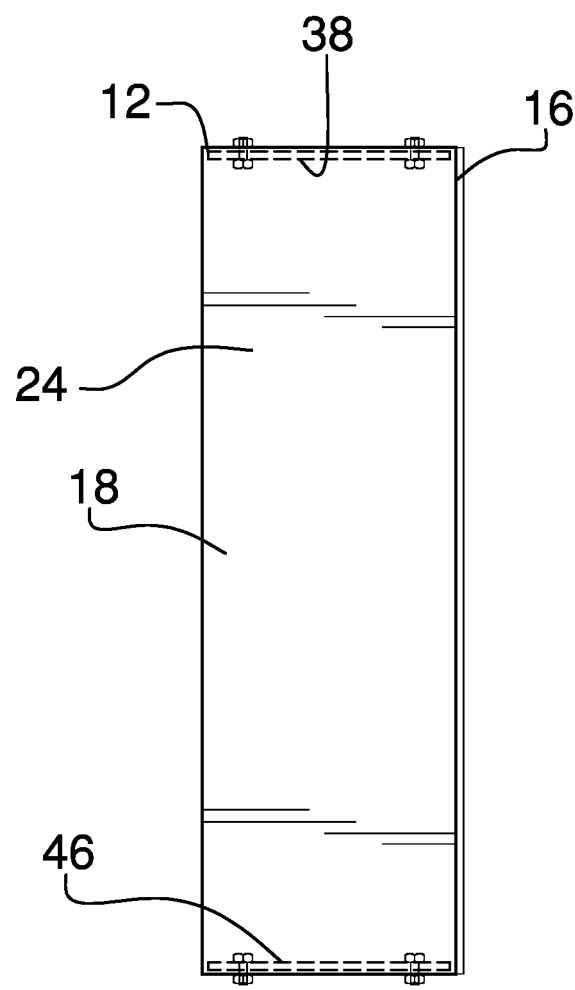
FIG. 4 is a right side phantom view of an embodiment of the disclosure.
Figure 5:
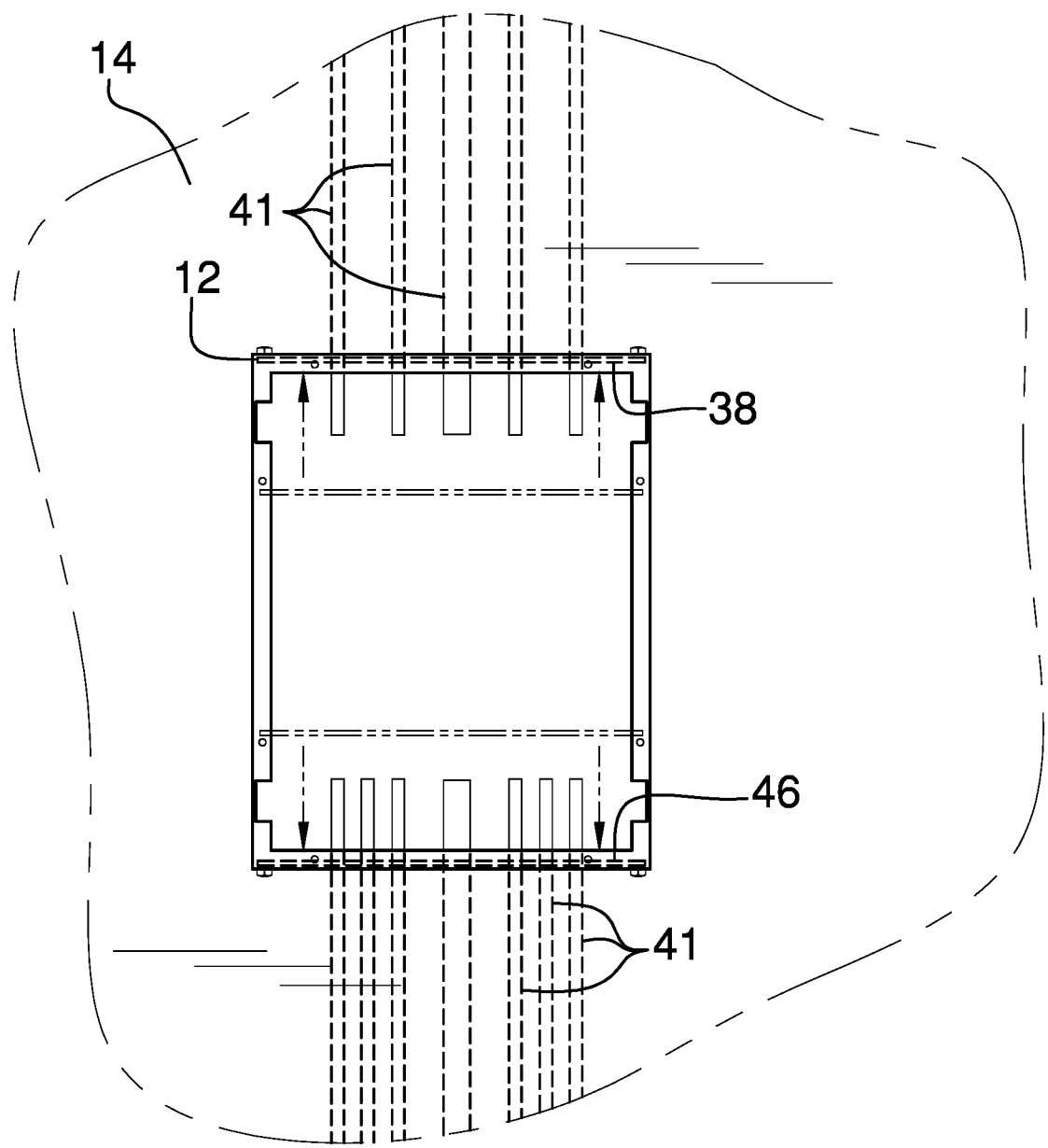
FIG. 5 is a perspective in-use view of an embodiment of the disclosure.

With reference now to the drawings, and in particular to FIGS. 1 through 5 thereof, a new electrical panel device embodying the principles and concepts of an embodiment of the disclosure and generally designated by the reference numeral 10 will be described.

As best illustrated in FIGS. 1 through 5, the electrical panel assembly 10 generally comprises an electrical panel 12 that is mountable in a wall 14. The wall 14 may be a wall 14 in a house, a building or any other structure that has electrical power. Additionally, the electrical panel 12 may house circuit breakers and electrical wiring that conform to the National Electrical Code in the Unites States. The electrical panel 12 has a front side 16 and an outer wall 18, and the outer wall 18 has a top side 20, a bottom side 22, a first lateral side 24 and a second lateral side 26. Each of the top 20, bottom 22 and front 16 sides is open to access an interior of the electrical panel 12.

The outer wall 18 has a front lip 28 that is oriented perpendicular thereto and the front lip 28 is aligned with and is coextensive with a perimeter of the front side 16. The front lip 28 has a pair of first slots 30 therein and each of the first slots 30 is spaced from the top side 20. Each of the first slots 30 is aligned with a respective one of the first 24 and second 26 lateral sides of the outer wall 18 and the first slots 30 are aligned with each other. The front lip 28 has a pair of second slots 32 therein and each of the second slots 32 is spaced from the bottom side 22. Each of the second slots 32 is aligned with a respective one of the first 24 and second 26 lateral sides of the outer wall 18 and the second slots 32 are aligned with each other.

The outer wall 18 has a top lip 34 that is oriented perpendicular thereto. Moreover, the top lip 34 is aligned with and is coextensive with a perimeter of the top side 20. The outer wall 18 has a bottom lip 36 that is oriented perpendicular thereto. Additionally, the bottom lip 36 is aligned with and is coextensive with a perimeter of the bottom side 22.

A top panel 38 is included that has a plurality of apertures 40 extending therethrough and each of the apertures 40 has a respective one of a plurality of conductors 41 extended therethrough. The top panel 38 has an upper surface 42 and a lower surface 44, and each of the apertures 40 extends through the upper 42 and lower 44 surfaces. The top panel 38 is removably positioned in the electrical panel 12; the top panel 38 is slidable through each of the first slots 30 in the front lip 28 for removing and installing the top panel 38 in the electrical panel 12. Moreover, the top side 20 of the electrical panel 12 has the conductors 41 extending therethrough and being unrestrained for easing mounting the electrical panel 12 in the wall 14. The top panel 38 is slid upwardly in the electrical panel 12 when the electrical panel 12 is mounted in the wall 14 having each of the apertures 40 insertably receiving the respective conductor 41 that extends through the top side 20 of the electrical panel 12. Additionally, the upper surface 42 of the top panel 38 abuts the top lip 34 when the top panel 38 is installed in the electrical panel 12.

A bottom panel 46 is included that has a plurality of apertures 48 extending therethrough and each of the apertures 48 in the bottom panel 46 has a respective one of the conductors 41 extended therethrough. The bottom panel 46 has a top surface 50 and a bottom surface 52, and each of the apertures 48 in the bottom panel 46 extends through the top 50 and bottom 52 surfaces. The bottom panel 46 is slidable through each of the second slots 32 in the front lip 28 for removing and installing the bottom panel 46 in the electrical panel 12. The bottom side 22 of the electrical panel 12 has conductors 41 extending therethrough and being unrestrained for easing mounting the electrical panel 12 in the wall 14. The bottom panel 46 is slid downwardly in the electrical panel 12 when the electrical panel 12 is mounted in the wall 14. Each of the apertures 48 in the bottom panel 46 insertably receives the respective conductor 41 that extends into the bottom side 22 of the electrical panel 12. Additionally, the bottom surface 52 of the bottom panel 46 abuts the bottom lip 36 when the bottom panel 46 is installed in the electrical panel 12. Each of the top 38 and bottom 46 panels may be fastened to the electrical panel 12 with screws, bolts or other removable fasteners.

In use, the electrical panel 12 primarily serves as a replacement panel for existing electrical panels or for installing an electrical panel in a finished wall 14. However, the electrical panel 12 that is disclosed can also be employed in new construction. The existing method of replacing electrical panels and installing electrical panels in finished walls often involves the conductors 41 being damaged by the top and bottom walls of the existing electrical panels. Often times the existing opening in sheetrock for the electrical panel that is being replaced is not large enough to accommodate the conductors 41 to be bent and manipulated into the replacement electrical panel. The removable top 38 and bottom 46 panels in the disclosed assembly serve to eliminate this problem. The conductors 41 can easily be slid through the open top 20 and bottom 22 sides of the outer wall 18 of the electrical panel 12 when the top 38 and bottom 46 panels are not present on the electrical panel 12.

Each of the top 38 and bottom 46 panels are inserted through the respective first 30 and second 32 slots after the electrical panel 12 has been mounted in the wall 14. The top panel 38 is slid upwardly in the electrical panel 12 and each of the conductors 41 that extends through the top side 20 of the electrical panel 12 are inserted through the respective apertures 40 in the top panel 38. The bottom panel 46 is downwardly in the electrical panel 12 and each of the conductors 41 that extends through the bottom side 22 of the electrical panel 12 are inserted through the respective apertures 48 in the bottom panel 46. Thus, the conductors 41 can be routed through the top 38 and bottom 46 panels after the electrical panel 12 has been mounted in the wall 14.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An electrical panel assembly having removable top and bottom plates wherein said assembly is configured to reduce damage to wires and surrounding structure when said assembly is installed, said assembly comprising:

an electrical panel being mountable in a wall, said electrical panel having a front side and an outer wall, said outer wall having a top side, a bottom side, a first lateral side and a second lateral side, each of said top, bottom and front sides being open to access an interior of said electrical panel;

a top panel being removably coupled to said top side of said electrical panel, said top panel having a plurality of apertures extending therethrough wherein each of said apertures is configured to have a conductor extended therethrough;

a bottom panel being removably coupled to said bottom side of said outer wall of said electrical panel, having a plurality of apertures extending therethrough wherein each of said apertures in said bottom panel is configured to have a conductor extended therethrough;

said outer wall having a front lip being oriented perpendicular thereto, said front lip being aligned with and being coextensive with a perimeter of said front side;

said front lip having a pair of first slots therein, each of said first slots being spaced from said top side, each of said first slots being aligned with a respective one of said first and second lateral sides of said outer wall, said first slots being aligned with each other; and said front lip having a pair of second slots therein, each of said second slots being spaced from said bottom side, each of said second slots being aligned with a respective one of said first and second lateral sides of said outer wall, said second slots being aligned with each other.

2. The assembly according to claim 1, wherein said outer wall has a top lip being oriented perpendicular thereto, said top lip being aligned with and being coextensive with a perimeter of said top side.

3. The assembly according to claim 1, wherein said outer wall has a bottom lip being oriented perpendicular thereto, said bottom lip being aligned with and being coextensive with a perimeter of said bottom side.

4. The assembly according to claim 2, wherein said top panel has an upper surface and a lower surface, each of said apertures in said top panel extending through said upper and lower surfaces, said top panel being removably positioned in said electrical panel, said top panel being slidable through each of said first slots in said front lip for removing and installing said top panel in said electrical panel.

5. The assembly according to claim 4, wherein said top side of said electrical panel has conductors extending therethrough and being unrestrained for easing mounting said electrical panel in the wall, said top panel being slid upwardly in said electrical panel when said electrical panel is mounted in the wall having each of said apertures insertably receiving a respective one of the conductors that extends through said top side of said electrical panel, said top surface of said top panel abutting said top lip when said top panel is installed in said electrical panel.

6. The assembly according to claim 3, wherein said bottom panel has a top surface and a bottom surface, each of said apertures in said bottom panel extending through said top and bottom surfaces, said bottom panel being slidable through each of said second slots in said front lip for removing and installing said bottom panel in said electrical panel, said bottom side of said electrical panel having conductors extending therethrough and being unrestrained for easing mounting said electrical panel in the wall.

7. The assembly according to claim 6, wherein said bottom panel is slid downwardly in said electrical panel when said electrical panel is mounted in the wall having each of said apertures in said bottom panel insertably receiving a respective one of the conductors that extends into said bottom side of said electrical panel, said bottom surface of said bottom panel abutting said bottom lip when said bottom panel is installed in said electrical panel.

8. An electrical panel assembly having removable top and bottom plates wherein said assembly is configured to reduce damage to wires and surrounding structure when said assembly is installed, said assembly comprising:
   an electrical panel being mountable in a wall, said electrical panel having a front side and an outer wall, said outer wall having a top side, a bottom side, a first lateral side and a second lateral side, each of said top, bottom and front sides being open to access an interior of said electrical panel, said outer wall having a front lip being oriented perpendicular thereto, said front lip being aligned with and being coextensive with a perimeter of said front side, said front lip having a pair of first slots therein, each of said first slots being spaced from said top side, each of said first slots being aligned with a respective one of said first and second lateral sides of said outer wall, said first slots being aligned with each other, said front lip having a pair of second slots therein, each of said second slots being spaced from said bottom side, each of said second slots being aligned with a respective one of said first and second lateral sides of said outer wall, said second slots being aligned with each other, said outer wall having a top lip being oriented perpendicular thereto, said top lip being aligned with and being coextensive with a perimeter of said top side, said outer wall having a bottom lip being oriented perpendicular thereto, said bottom lip being aligned with and being coextensive with a perimeter of said bottom side;
   a top panel having a plurality of apertures extending therethrough wherein each of said apertures is configured to have a conductor extended therethrough, said top panel having an upper surface and a lower surface, each of said apertures extending through said upper and lower surfaces, said top panel being removably positioned in said electrical panel, said top panel being slidable through each of said first slots in said front lip for removing and installing said top panel in said electrical panel, said top side of said electrical panel having conductors extending therethrough and being unrestrained for easing mounting said electrical panel in the wall, said top panel being slid upwardly in said electrical panel when said electrical panel is mounted in the wall having each of said apertures insertably receiving a respective one of the conductors that extends through said top side of said electrical panel, said top surface of said top panel abutting said top lip when said top panel is installed in said electrical panel; and
   a bottom panel having a plurality of apertures extending therethrough wherein each of said apertures in said bottom panel is configured to have a conductor extended therethrough, said bottom panel having a top surface and a bottom surface, each of said apertures in said bottom panel extending through said top and bottom surfaces, said bottom panel being slidable through each of said second slots in said front lip for removing and installing said bottom panel in said electrical panel, said bottom side of said electrical panel having conductors extending therethrough and being unrestrained for easing mounting said electrical panel in the wall, said bottom panel being slid downwardly in said electrical panel when said electrical panel is mounted in the wall having each of said apertures in said bottom panel insertably receiving a respective one of the conductors that extends into said bottom side of said electrical panel, said bottom surface of said bottom panel abutting said bottom lip when said bottom panel is installed in said electrical panel.

* * * * *